Patented Feb. 12, 1952

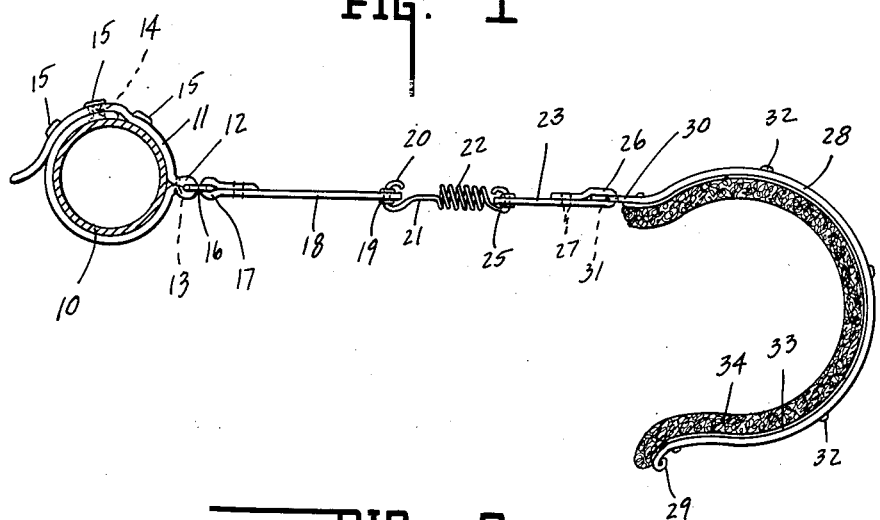
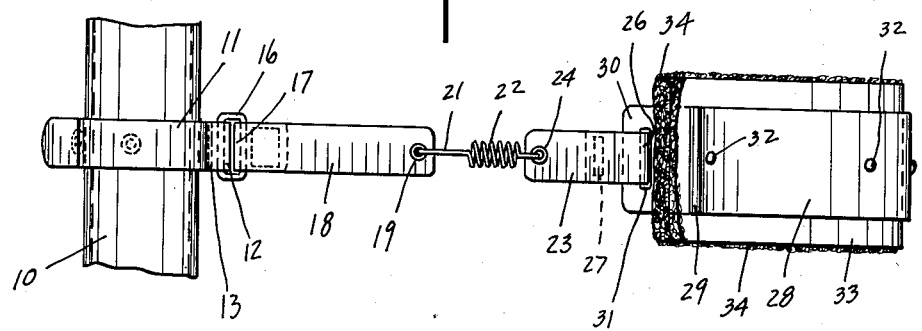
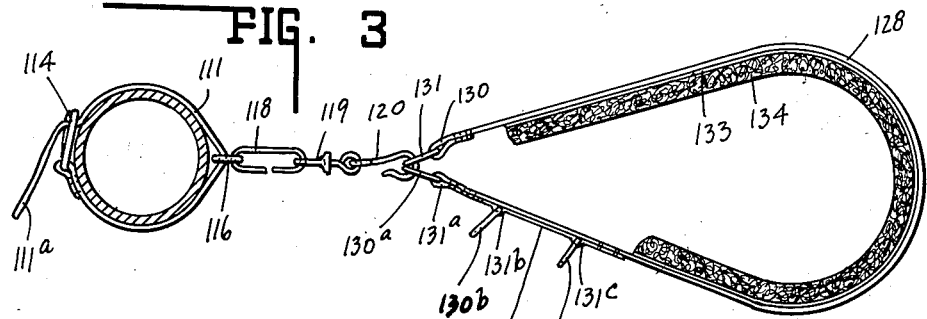
INVENTOR.
JOHN W. McILWRAITH.

2,585,398

UNITED STATES PATENT OFFICE 2,585,398

LEG SUPPORT FOR VEHICLE DRIVERS

John W. McIlwraith, New Castle, Pa.

Application August 12, 1948, Serial No. 43,912

7 Claims. (Cl. 155—165)

This invention relates to a leg support for vehicle drivers.

The chief object of the present invention is to provide a leg rest or support that can be readily attached to the vehicle, readily adjusted to the driver and can be used with equal facility upon right and left hand driven cars.

All cars have a steering column or post behind which is the driver's seat. Same usually is disposed to one side or the other of the vehicle. In long periods of driving the driver usually rests the knee closest to the near side of the vehicle against that side or door thereof. This in a right drive car is the "clutch" side. The other leg normally is bent for throttle and brake control contact purposes.

The present invention accordingly is directed to a non-interfering support for the said other leg.

The chief feature of the present invention resides in the adjustability, flexibility and non-interfering character of such a support.

Other objects and features of the invention will be set forth more fully hereinafter.

The full nature of the invention will be understood from the accompanying drawings and the following description and claims:

In the drawings Fig. 1 is a plan view of the invention applied to a left drive vehicle steering post, the latter being shown in transverse section.

Fig. 2 is an elevational view of the aforesaid.

Fig. 3 is a view similar to Fig. 1 and of a modified form of the invention.

In Figs. 1 and 2 of the drawings 10 indicates a conventional steering post of a left drive vehicle. A strap 11 includes an eye portion 12 formed by sewing 13. The strap at one end includes the male portion 14 of a glove fastener and same is directed outwardly toward the other end which includes a plurality of spaced female portions 15 of glove fastener type and selectively associable with portion 14 to clamp the strap upon the column in adjusted position that is up or down and about the same as desired or required.

Secured in eye portion 12 is one leg of a rectangular loop member 16. The opposite leg is secured in eye portion 17 at one end of strap 18. The other end includes a grommet 19 that takes the curled end 20 of an extension 21 of a coil spring 22.

A confronting strap 23 includes in one end grommet 24 to take the other end and loop end 25 of said spring. The other end of strap 23 is doubled back upon itself to form eye 26 and the free end is sewed at 27.

A flexible metal band 28, of U-shape, at one end includes outwardly directed curled lip 29. The other end 30 is slotted at 31 to take the eye portion 26 of strap 23. Secured to the inside face of this U-shaped band, as by copper rivets 32 or the like is a sheepskin pad 33 with wool side 34 directed inwardly as shown.

The leg support described provides great flexibility see, connections 16, 19, 24 and 26 as well as spring 22. The U-shaped padded hook will yield slightly. Being padded it will not chafe the driver's leg. In effect the hook may be disposed as shown in Fig. 1 or transverse to that position or in an intermediate position as desired or required.

In Fig. 3 there is illustrated a modified and the preferred form of the invention. Herein 10 again indicates the steering column. 111 indicates a strap that passes through a loop 116. Strap 111 at one end mounts a buckle 114 and the other end 111a of said strap is associated therewith to clamp upon said column.

Hooked in loop 116 is a safety clip 118 hereinafter to be referred to more fully. Also hooked to the clip is a swivel structure 119 in turn connected to a hook 120. A fabric strap 128 has secured to it the wider sheepskin portion 133 with wool side 134 disposed inwardly.

Strap 128 terminates at one end in anchorage 130 securing loop or ring 131. Its other end terminates in an extension portion 128a that provides a plurality of anchorages, herein three being shown and designated 130a, 130b and 130c, each securing a suitable ring or loop 131a, 131b and 131c respectively. Ring 131 and one of the rings designated by that number with a subscript are secured to hook 120.

Thus the present form of invention envelopes the driver's right leg at the preferred location for leg support purposes. When an emergency arises the driver can readily move the supported leg to the right which will open safely clip 118 since it is of bendable material and may be of paper clip stock type.

While the invention has been illustrated and described in great detail in the drawings and foregoing description, the same is to be considered as illustrative and not restrictive in character.

The modification described herein as well as others which will readily suggest themselves to persons skilled in this art, all are considered to be within the broad scope of the invention, reference being had to the appended claims.

The invention claimed is:

1. A driver's leg rest structure for a vehicle having a steering post comprising in combination an adjustable clamping strap for post mounting, a leg embracing member, and yieldable means connecting the strap and member together.

2. A structure as defined by claim 1 wherein the member comprises a flexible metal band and a padded portion covering the interior face thereof.

3. A structure as defined by claim 1 wherein the yieldable means comprises a coil tension spring.

4. A driver's leg rest structure for a vehicle, comprising an adjustable strap for vehicle attachment, a leg embracing member including a flexible metal band and a padded portion covering the interior face thereof, and linkage connecting said strap and said band, said linkage including a deformable element responsive to a predetermined amount of tensional force to effect band release.

5. A driver's leg rest structure for a vehicle having a steering column, comprising an adjustable clamping strap adapted for attachment to the vehicle, a leg embracing member including a flexible metal band and a padded portion covering a substantial portion of the interior face thereof, and a coupling connection between said strap and said band, said connection including a swivel element whereby said band is movable to different planes relative to said strap and at different angles relative to said column.

6. A driver's leg rest structure for a vehicle having a steering column, comprising an adjustable column enveloping strap, a leg enveloping member including a flexible metal band and a padded portion covering a substantial part of the interior face thereof, and linkage connecting said strap and said band, said linkage including an element of deformable character responsive to a predetermined amount of tensional force for band release, and a swivel element.

7. A driver's leg rest structure for a vehicle having a steering column comprising an adjustable clamping strap enveloping said column, a leg enveloping member including a flexible metal band and a padded portion covering a substantial part of the interior face thereof, said band having a plurality of longitudinally spaced anchoring elements, and a coupling connection between said strap and said band, said connection including a readily deformable element connected to said strap, a swivel element connected to said deformable element, and a hook connected to said swivel element and to said band, said anchoring elements being selectively adapted for connection to said hook to vary the distance separating said column from the remote portion of said padded portion.

JOHN W. McILWRAITH.

REFERENCES CITED

The following references are of record in the file of this patent:

UNITED STATES PATENTS

| Number | Name | Date |
|---|---|---|
| 1,208,442 | Allen | Dec. 12, 1916 |
| 1,885,750 | Miller | Nov. 1, 1932 |
| 2,133,443 | Girl | Oct. 18, 1938 |
| 2,328,991 | Murdaugh | Sept. 7, 1942 |